United States Patent [19]

Nagahara

[11] 4,399,201
[45] Aug. 16, 1983

[54] BATTERY CASING

[75] Inventor: Kazuyuki Nagahara, Katsuta, Japan

[73] Assignee: Hitachi Koki Company, Limited, Tokyo, Japan

[21] Appl. No.: 268,504

[22] Filed: May 29, 1981

[51] Int. Cl.³ .................. H01M 6/00; H01M 8/00; H01M 2/02; H01M 2/00
[52] U.S. Cl. .................. 429/48; 429/97; 429/159; 429/179; 429/65
[58] Field of Search .............. 429/151, 159, 175, 176, 429/179, 1, 48, 97, 65

[56] References Cited

U.S. PATENT DOCUMENTS

| Re. 28,948 | 8/1976 | Kaye | 429/1 |
|---|---|---|---|
| 2,096,628 | 10/1937 | Diebel | 429/1 |
| 2,590,804 | 3/1952 | Vitale | 429/97 |
| 2,975,226 | 3/1961 | Lehr | 429/97 |
| 3,186,878 | 6/1965 | Filander | 429/97 |
| 3,956,021 | 5/1976 | Tsygankov | 429/97 |
| 4,200,683 | 4/1980 | Bant | 429/48 |

Primary Examiner—Donald L. Walton
Assistant Examiner—S. J. Kalafut
Attorney, Agent, or Firm—Pollock, Vande Sande & Priddy

[57] ABSTRACT

A battery casing for receiving one or more batteries, such as dry cells, to supply a battery-powered electrical device comprises first and second terminals for deriving electrical power from the battery. At least one of the first and second terminals is entirely received in the bore of the casing and is arranged to be in contact with an external conductor which will be inserted through an opening made in the top portion of the casing. The battery casing comprises a slidable member which opens and closes the opening at the top portion. The slidable member can be manipulated to assume its closed position so as to isolate at least one of the first and second terminals from the outside of the casing, preventing the terminals from making a short circuit. One of the first and second terminals, which can be isolated by the slidable member, is fixedly supported by an insulating member and is substantially U-shaped, while the other terminal may be L-shaped and a portion thereof is exposed outside.

11 Claims, 4 Drawing Figures

BATTERY CASING

BACKGROUND OF THE INVENTION

This invention relates generally to casings for containing one or more batteries, such as dry cells. More particularly, the present invention relates to improvement of an arrangement of a battery casing with which positive and negative terminals of the casing are effectively prevented from making a short circuit.

Conventional battery casings have been provided hitherto with two terminals which are respectively arranged to be connected to positive and negative electrodes of the battery in the casing. These two terminals are attached to the casing in such a manner that these terminals are exposed outside so that the terminals of the battery casing are able to be in contact with external conductors through which electrical energy can be derived. For instance, in a battery-powered electrical tool, such as a handy electrical drill, the battery casing is fitted in a handle portion of the drill to supply the motor of the drill with electrical power via the exposed terminals and the conductors arranged to be in contact with the exposed terminals.

However, since the pair of terminals of the battery casing are exposed outside, these electrodes have chances to be electrically connected undesirably to make a short circuit by means of an external conductor. Especially, when the battery casing is taken out or detached from the battery-powered device, the pair of terminals are exposed outside, and therefore, such an undesirable accident is apt to occur. Furthermore, the exposed terminals easily get dirt and corrode, resulting in unreliable or poor contact between the terminals and the external conductors.

SUMMARY OF THE INVENTION

The present invention has been developed in order to remove the above-described disadvantages and drawbacks inherent to the conventional battery casings.

It is, therefore, an object of the present invention to provide a new and useful battery casing having a pair of terminals, at least one of which is placed inside the casing.

According to a feature of the present invention, a movable member made of an insulating material is provided to cover the terminal which is provided inside the casing, so that the terminal is securely prevented from making a short circuit with the other terminal even when the battery casing is detached from a battery-powered electrical device.

In accordance with the present invention there is provided a battery casing for use with a battery-powered electrical device, having a casing and first and second terminals for deriving electrical power from at least one battery received in the bore of said casing, characterized by a movable piece, which is capable of covering at least one of said first and second terminals, when said battery casing is unused.

In accordance with the present invention there is also provided a battery casing for use with a battery-powered electrical device for supplying said device with electrical power from at least one battery received in said battery casing, comprising: (a) a casing for receiving said at least one battery therein, said casing having a top portion in which at least one opening is made; (b) a first terminal fixedly supported in said bore of said casing at such a position that said first terminal can be connected to an external conductor via said opening; (c) a second terminal fixedly attached to said casing in such a manner that a portion of said second terminal is exposed outside; and (d) a movable piece slidably attached to said top portion of said casing, and is arranged to assume first and second positions for opening and closing said opening.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF THE INVENTION

Prior to describing the preferred embodiment of the present invention, a conventional battery casing will be discussed with reference to FIG. 1 for a better understanding of the object and features of the present invention.

Figure 1:
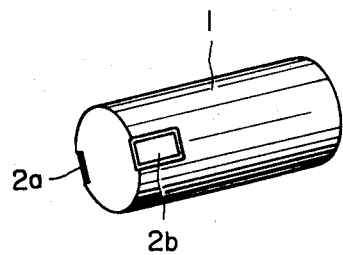
FIG. 1 is a perspective view of a typical conventional battery casing.

FIG. 1 illustrates a typical conventional battery casing for containing one or more dry cells. The battery casing is arranged to be received in a portion of a battery-powered electrical device, such as a handy electric tool or the like. The casing is generally indicated at a reference numeral 1, and comprises a pair of terminals 2a and 2b which are attached to the outside of the casing 1. The terminals 2a and 2b are respectively connected to the positive and negative electrodes of the dry cell or dry cells (not shown) contained in the casing 1. The electrical power of the dry cell(s) can be derived via the terminals 2a and 2b and conductors (not shown) which will be respectively in contact with the exposed terminals 2a and 2b. Since both the terminals 2a and 2b are exposed outside, the terminals 2and 2b are apt to be electrically connected to each other to make a short circuit. For instance, when the battery casing 1 is taken out of the electrical device, and is placed on a conductive plate in such a manner that the terminals 2a and 2b are in contact with the conductive plate, the terminals 2a and 2b are electrically connected via the conductive plate to rapidly consume the electric power of the dry cell(s).

Figure 2:
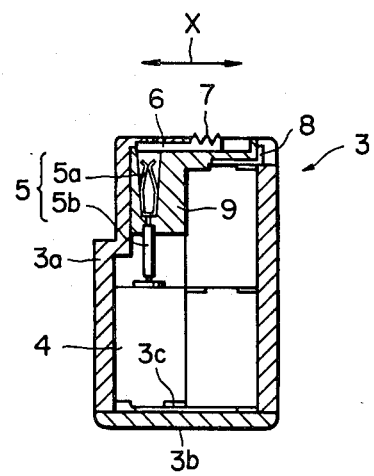
FIG. 2 is a schematic cross-sectional view of an embodiment of the battery casing according to the present invention.

Reference is now made to FIG. 2 which is a schematic cross-sectional view of an embodiment of the battery casing according to the present invention. The casing is generally designated at a numeral 3, and comprises a body 3a and a lid 3b. The lid 3b is detachable from the body 3a so that one or more dry cells 4 can be fitted in the casing 3. In this embodiment, three dry cells 4 are shown to be contained in the battery casing 3. The lid 3b has a conductive plate 3c which is arranged to be in contact with a positive electrode of one of the dry cells 4, and with a negative electrode of another dry cell 4. The casing 3 is generally cylindrical, and comprises a first terminal 5 and a second terminal 8 respectively arranged to be in contact with electrodes of the dry cells 4.

The first terminal 5 comprises a generally U-shaped conductor 5a which is made of a leaf spring, and a conductive member 5b connected to one end of the U-shaped conductor 5a. The first terminal 5 is fixedly supported in the bore of the casing 3 by means of an insulating member 9, which may be made of a synthetic resin. The insulating member 9 may have a through-hole so that the first terminal 5 can be inserted therethrough.

The second terminal 8 is L-shaped, and is connected to a portion of the insulating member 9. A portion of the second terminal 8 is arranged to be exposed outside the casing 3.

A movable piece 6 is provided at a top portion of the battery casing 3, and is slidably attached to the top portion of the casing 3. In detail, a portion of the movable piece 6 is interposed between the inner surface of the top portion of the casing 3 and the above-mentioned insulating member 9. The movable piece 6 has a projecting portion 7 which projects outside the casing 3 via an opening 20 made in the top portion of the casing 3. The movable piece 6 is slidable in a direction of an arrow X as shown in FIG. 2.

Figure 3:
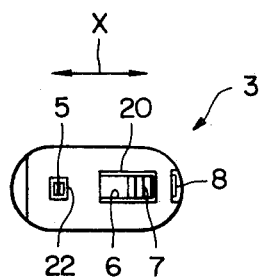
FIG. 3 is a schematic top plan view of the battery casing of FIG. 2.

As best seen in FIG. 3, which is a top plan view of the battery casing 3, the top portion of the casing 3 has another opening 22 at a position corresponding to the position of the first terminal 5. With this arrangement, when the movable piece 6 is pushed to the right in FIG. 2 or FIG. 3, the opening 22 communicates with the through-hole of the insulating member 9. As a result, the first terminal 5 is able to be in contact with an external conductor which may be inserted through the opening 22. On the other hand, when the movable piece 6 assumes its left-most position, as shown in FIG. 2, the through-hole of the insulating member 9 is covered by a portion of the movable piece 6. Namely, the first terminal 5 is isolated from the outside of the casing 3. The position of the movable piece 6 may be freely changed by manually pushing the projecting portion 7 in the rightward and leftward directions. The movable piece 6 is prevented from easily moving unless the projecting portion 7 is manipulated because a portion of the movable piece 6 is interposed between the top portion of the casing 3 and the insulating member 9 in such a manner that suitable pressure and friction are applied to the movable piece 6. However, if desired, in place of such an arrangement a suitable biasing means, such as a spring, and a locking member may be provided so that the movable piece 6 can perform a snap action to open and close the opening 22 or window.

Figure 4:
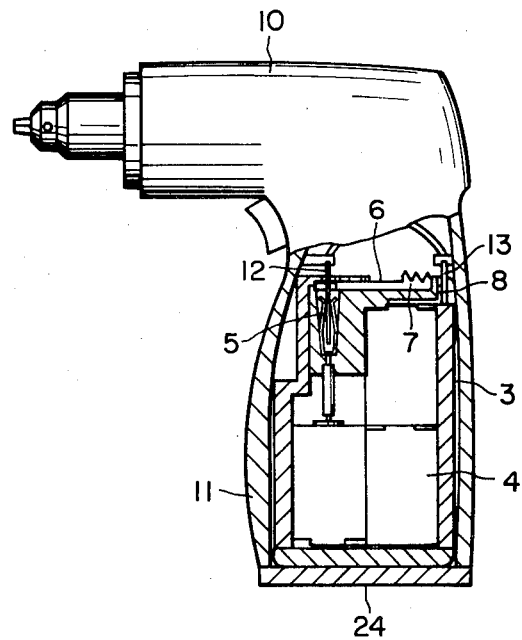
FIG. 4 is a schematic partial cross-sectional view of an electrical tool having the battery casing of FIGS. 2 and 3.

Reference is now made to FIG. 4 which shows a schematic partial cross-sectional view of an electrical tool having the battery casing of FIGS. 2 and 3. The same elements and parts as in FIGS. 2 and 3 are designated at like numerals. The electrical tool is generally designated at a reference 10, and comprises a handle 11. The handle 11 is generally cylindrical so as to receive the battery casing 3 therein. The handle 11 comprises a bottom plate 24 which is detachable from the body of the handle. When intended to incorporate the battery casing 3 with the electrical tool 10, the bottom plate 24 is first detached, and the battery casing 3 is inserted in the bore of the handle 11 in the longitudinal direction of the handle 11, namely in the direction of the height of the battery casing 3. Before inserting the battery casing 3, the movable piece 6 has to be set in an open state so that the first terminal 5 is contactable with an external conductor through the opening 22.

The electrical tool 10 has first and second conductive pins 12 and 13 which respectively extend in a direction parallel to the above-mentioned longitudinal direction of the handle 11. The distance between the first and second pins 12 and 13, and the positions thereof are selected so that these pins 12 and 13 can respectively be in contact with the first and second terminals 5 and 8 of the battery casing 3. Namely, as the battery casing 3 is pushed up, the first pin 12 is received in the U-shaped first terminal 5 through the opening 22, while the second pin 13 is in contact with the exposed portion of the second terminal 8. With this arrangement, the electrical power of the dry cells 4 contained in the battery casing 3 can be fed via the first and second terminals 5 and 8 and also via the first and second pins 12 and 13 to the motor (not shown) of the electrical tool 10. As shown in FIG. 4, the first and second pins 12 and 13 are respectively supported by means of suitable supporting members (no numerals) so as to assume the same position all the time. The bottom plate 24 is attached to the body of the handle 11 to prevent the battery casing 3 from dropping.

When the electrical tool 10 is not used or is to be carried, the battery casing 3 may be taken out. After detaching the battery casing 3 from the electrical tool 10, the movable piece 6 is manipulated by depressing the projecting portion 7 so as to close or shut the opening 22. As a result, the first terminal 5 is isolated from the outside of the casing 3, and thus the first terminal 5 is securely prevented from undesirably making a short circuit with the second terminal 8. In addition, since the first terminal 5 is isolated from the ambient air, undesirable corrosion of the first terminal 5 does not occur.

In the above described embodiment, only the first terminal 5 is entirely received in the bore of the casing 3. However, if desired, both the first and second terminals 5 and 8 may be entirely received therein.

Although the embodiment has been described in connection with an electrical tool 10 of FIG. 4, the battery casing 3 according to the present invention may be adapted to any electrical devices which are battery powered. Moreover, the shape of the casing may be freely changed to the shape of a space in an electrical device, while the number of battery cells may be changed to meet required voltage and current. Namely, the dry cells may in connected in series or in parallel, or in series-parallel.

The above-described embodiment is just an example of the invention, and therefore, it will be apparent for those skilled in the art that many modifications and variations may be made without departing from the spirit of the present invention.

What is claimed is:

1. A battery cartridge for use with a battery-powered electrical device, comprising:
    (a) a casing for containing therein a plurality of dry cell batteries, said casing being detachable from said electrical device;
    (b) first and second output terminals for supplying said electrical device with electrical power therethrough from said dry cell batteries, at least one of said first and second output terminals being positioned within said casing, said first and/or second output terminals, which is/are positioned within said casing, being arranged to be in contact with a conductive projection of said electrical device when said projection is inserted into said casing via an opening provided in the vicinity of said first and/or second output terminal, which is/are positioned within said casing;

(c) a movable piece arranged to assume first and second positions, said movable piece covering said opening when in said first position and uncovering said opening when in said second position for allowing said projection to be inserted into said casing via said opening.

2. A battery cartridge as claimed in claim 1, wherein said movable piece is slidably attached to the top portion of said battery casing.

3. A battery cartridge as claimed in claim 1, wherein said movable piece comprises a projecting portion exposed outside said casing so that said movable piece can be manipulated to assume said first and second positions.

4. A battery cartridge as claimed in claim 1, wherein said first and/or second terminals positioned within said casing comprises a U-shaped metal strip for sandwiching said conductive projection of said electrical device when engaged therewith.

5. A battery cartridge as claimed in claim 1, wherein said first terminal is substantially U-shaped.

6. A battery cartridge as claimed in claim 1, wherein said second terminal is substantially L-shaped, and comprises a portion exposed outside said casing.

7. A battery cartridge as claimed in claim 1, further comprising an insulating member for supporting said first terminal.

8. A battery cartridge as claimed in claim 7, wherein said movable piece comprises a portion interposed between the inner surface of said top portion of said casing and said insulating member, and a projecting portion exposed outside said casing via another opening made in said top portion.

9. A battery cartridge as claimed in claim 1, further comprising a lid which is detachable from said casing.

10. A battery cartridge as claimed in claim 1, further comprising at least one conductor for connecting a positive electrode of one of said dry cell batteries to a negative electrode of another dry cell battery.

11. A battery cartridge for use with a battery-powered electrical device, comprising:

(a) a casing for containing therein a plurality of dry cell batteries, said casing being detachable from said electrical device and having a top portion in which an opening is made;

(b) a first output terminal fixedly supported within said casing in the vicinity of said opening, said first output terminal being arranged to be in contact with a conductive projection of said electrical device when said projection is inserted into said casing via said opening;

(c) a second output terminal fixedly attached to said casing in such a manner that a portion of said second terminal is exposed outside to be in contact with a conductor of said electrical device, said electrical device being arranged to be supplied with power from said dry cell batteries via said first and second output terminals; and (d) a movable piece arranged to assume first and second positions, said movable piece covering said opening when in said first position and uncovering said opening when in said second position for allowing said projection to be inserted into said casing via said opening.

* * * * *